Dec. 1, 1942. W. P. SCHMITTER 2,304,032
REVERSIBLE MULTISPEED DRIVE
Filed Aug. 14, 1940 2 Sheets-Sheet 1

Walter P. Schmitter
INVENTOR.

BY
ATTORNEY.

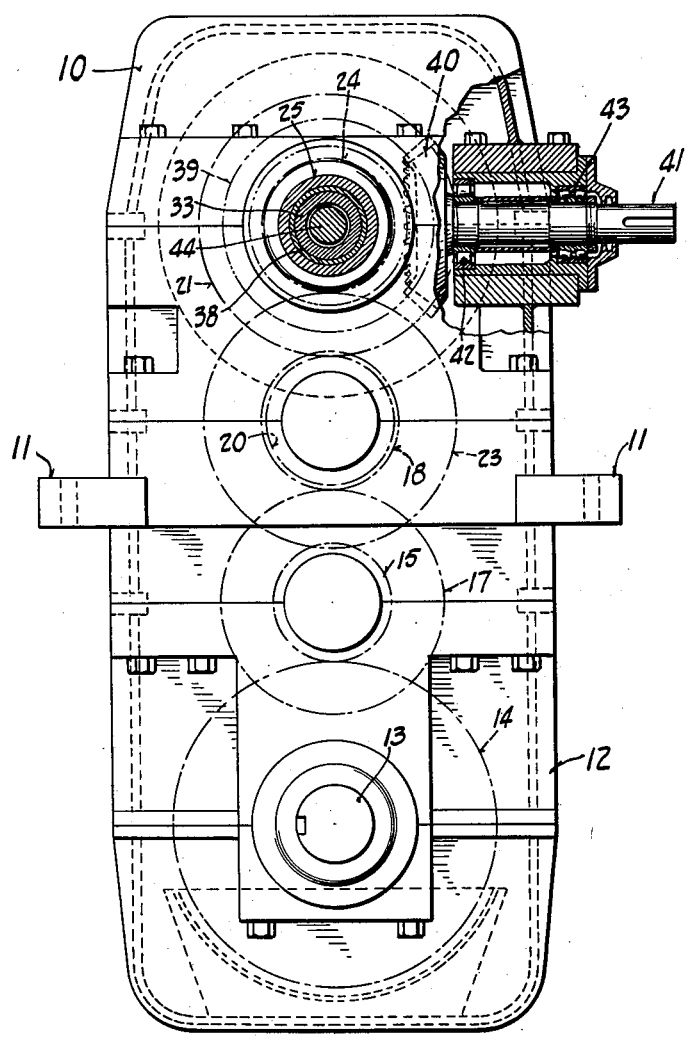

Patented Dec. 1, 1942

2,304,032

UNITED STATES PATENT OFFICE 2,304,032

REVERSIBLE MULTISPEED DRIVE

Walter P. Schmitter, Wauwatosa, Wis., assignor to The Falk Corporation, Milwaukee, Wis., a corporation of Wisconsin Application August 14, 1940, Serial No. 352,496

2 Claims. (Cl. 74—360)

This invention relates to reversible multispeed drives for use primarily in Diesel locomotives although other uses are contemplated.

One object of the present invention is to provide a readily controlled, compact, heavy duty drive for locomotives and the like which will afford operation at a plurality of speeds in either of two directions.

Other more specific objects and advantages will appear, expressed or implied, from the following description of an illustrative embodiment of this invention.

In the accompanying drawings:

Fig. 2 is a sectional view on the line 2—2 of Fig. 1 with the casing broken away.

Figure 1:
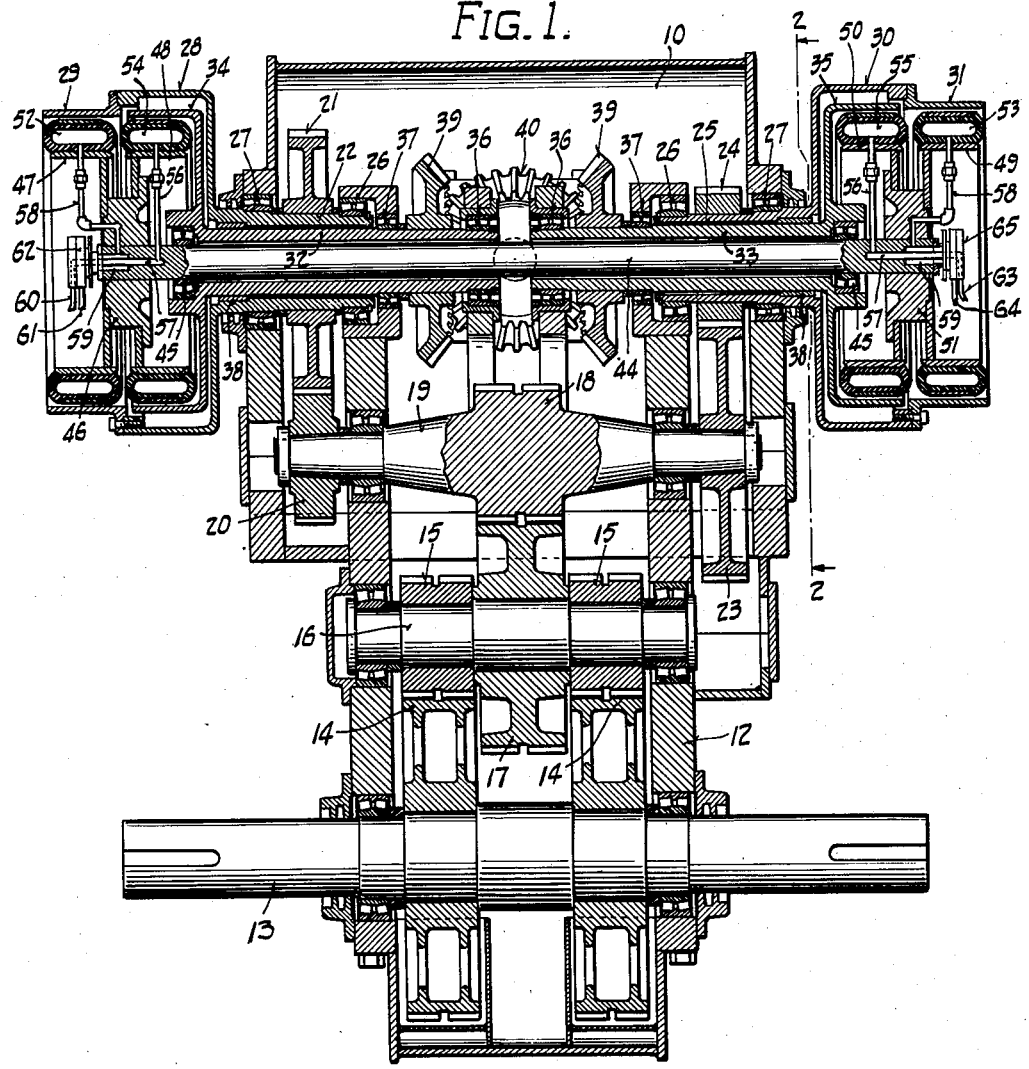
Figure 1 is a vertical sectional view of a locomotive drive mechanism constructed in accordance with the present invention.

The drive mechanism selected for illustration is enclosed within a vertical housing 10 adapted to project through the platform or floor of a locomotive to which it is securely anchored through appropriate fore and aft mounting lugs 11. The lower laterally reduced portion 12 of the housing supports a driven shaft 13 which projects laterally in opposite directions therefrom.

A pair of herringbone or double helical gears 14 are fixed to the shaft 13 and driven by a pair of pinions 15 on a shaft 16 driven by a herringbone gear 17. The gear 17 meshes with and is driven by a herringbone pinion 18 on a shaft 19. This train of gears provides a double reduction in speed between the shaft 19 and shaft 13.

Provision is made for driving the shaft 19 at one speed in either direction through a pinion 20 on one end of shaft 19 which meshes with a driving gear 21 on a hollow shaft 22, or at a somewhat lower speed in either direction through a gear 23 on the other end of shaft 19 which meshes with a driving pinion 24 on a hollow shaft 25.

In this instance, the hollow shafts 22 and 25 are coaxially disposed, each being rigidly supported in axially spaced bearings 26 and 27 in the housing. Mounted on the outer end of the shaft 22 is a head 28 carrying a clutch ring 29, and mounted on the outer end of the shaft 25 is a head 30 carrying a clutch ring 31.

Two coaxial hollow shafts 32 and 33 extend substantially from a mid point in the housing through the hollow shafts 22 and 25, respectively, shaft 32 carrying a clutch ring 34 disposed concentrically within the head 28 beside the clutch ring 29, and shaft 33 carrying a clutch ring 35 disposed concentrically within the head 30 beside the clutch ring 31. Each of the shafts 32 and 33 is supported adjacent its inner end by axially spaced bearings 36 and 37 fixed in the housing, and at its outer end each is additionally supported by a steady bearing 38 contained within the surrounding shaft 22 or 25.

The shafts 32 and 33 are continuously driven in opposite directions by appropriate means, such as bevel gears 39, each fixed to one of those shafts between the bearings 36 and 37 thereof. Both bevel gears 39 mesh with a driving bevel gear 40 fixed to the end of a drive shaft 41 journalled in axially spaced bearings 42 and 43 in the housing.

A single shaft 44 extends through both of the hollow shafts 32 and 33 and is journalled in bearings 45 supported by the latter. A head 46 fixed to one end of shaft 44 carries an inner clutch ring 47 concentrically disposed within the outer clutch ring 29 and an inner clutch ring 48 similarly disposed with respect to the outer clutch ring 34. Likewise, inner clutch rings 49 and 50, within the outer clutch rings 31 and 35, respectively, are carried by a head 51 on the other end of the shaft 44.

A hollow annular gland 52 of flexible material, such as rubber, preferably reinforced with imbedded cords or fabric, is fixed to the inner clutch ring 47 between it and the outer ring 29. The arrangement is such that by the application of fluid pressure to the gland 52 the latter may be expanded into gripping engagement with the ring 29, to thereby provide a flexible torque transmitting connection therebetween. When the gland 52 is thus expanded the clutch ring 47 and shaft 44 are driven in one direction from the hollow shaft 22. A similar gland 53 fixed to the clutch ring 49 is expandable into gripping engagement with the clutch ring 31 to drive the shaft 44 in the opposite direction from the oppositely rotating shaft 24.

The shaft 44, thus rotatable in either direction, is releasably connectable to the shaft 32, to thereby effect rotation of the shaft 19 and consequently the shaft 13 in either direction and at a speed determined by the ratio between the gear 21 and pinion 20; and the shaft 44 is also releasably connectable to the shaft 33, to thereby effect rotation of the shaft 19 and consequently the shaft 13 in either direction and at a lower speed determined by the ratio between the pinion 24 and gear 23. Releasable connection between the shaft 44 and shaft 32 is effected by a gland 54, similar to glands 52 and 53, fixed to the clutch ring 48 and expandable into gripping engagement with the clutch ring 34; and in a similar manner a releasable connection between the shaft 44 and shaft 33 is effected by a similar gland 55 on the clutch ring 52 and expandible into gripping engagement with the clutch ring 35.

It will thus be noted that the direction of operation of the driven shaft 13 is determined by admitting fluid pressure to one or the other of the glands 52 or 53 and that the rate of operation of the shaft 13 is determined by admitting fluid pressure to one or the other of the glands 54 or 55.

The application of fluid pressure to and release of pressure from the several glands 52, 53, 54 and 55 may be effected and controlled in various ways. In the drive mechanism shown, this is accomplished in a manner similar to that disclosed in my copending application Serial No. 301,930, filed October 30, 1939. Each of the glands 54 and 55 communicates through a separate pipe 56 with a tube 57 in one end or the other of the shaft 44, and each of glands 52 and 53 communicates through a separate pipe 58 with a separate bore 59 surrounding one or the other of the tubes 57 in the opposite ends of the shaft 44. Two stationary pipes 60 and 61 communicate, respectively, through an appropriate joint 62, with that tube 57 and bore 59 which communicate with the glands 52 and 54, respectively; and two stationary pipes 63 and 64 communicate, respectively, through a similar joint 65, with that tube 57 and bore 59 which communicate with the glands 53 and 55 respectively. The joints 62 and 65, which permit free rotation of the shaft 44 with respect to the stationary pipes 60, 61, 63 and 64 and at the same time maintain separate communication between those pipes and the bores 59 and tube 57, respectively, are fully disclosed in the application above identified. Each of the pipes 60, 61, 63 and 64 functions as a fluid pressure supply and exhaust pipe and they are controlled in a well known manner by appropriate valves.

It will be noted from the foregoing that a readily controlled, compact drive mechanism has been provided through which power applied to the drive shaft 41 may be transmitted to the driven shaft 13 to effect operation thereof at either of two speeds in either of two directions. That is to say, by application of fluid pressure to either of the pipes 61 or 64, one of the corresponding glands 52 or 53 may be expanded to cause the shaft 44 to be driven in one direction or the other from one or the other of the oppositely rotating shafts 22 or 25, and by application of fluid pressure to either of the two pipes 60 or 63, one of the corresponding glands 54 or 55 may be expanded to drive the shaft 13 from the shaft 44 at one speed through the gear 21 and pinion 20 or at a lower speed through the pinion 24 and gear 23, the direction of operation thereof being dependent upon the direction of operation of shaft 44, and the rate and direction of operation of shaft 13 is of course determined by the rate and direction of operation of the shaft 13.

Various changes may be made in the embodiment of the invention as hereinabove specifically described without departing from or sacrificing the advantages of the invention as defined in the appended claims.

I claim:

1. In a power transmission the combination of driving means including oppositely rotating members, a shaft, means including a pair of clutches selectively operable to connect said shaft to one or the other of said members, said clutches being disposed at opposite ends of said shaft, a driven member, two gear trains of different ratio connected with said driven member, and means including a second pair of clutches at opposite ends of said shaft selectively operable to connect said shaft with one or the other of said gear trains.

2. In a power transmission the combination of driving means including two oppositely rotating gears, a driven member, two gear trains of different ratios connected with said driven member, a shaft, a pair of inner clutch elements fixed to one end of said shaft, an outer clutch element encircling one of said clutch elements and connected with one of said gears, another outer clutch element encircling the other of said inner clutch elements and connected with one of said gear trains, a second pair of inner clutch elements fixed to the other end of said shaft, an outer clutch element encircling one of said last named inner clutch elements and connected with the other of said gears, another outer clutch element encircling the other of said last named inner clutch elements and connected with the other of said gear trains, and a separate fluid pressure container between each of said inner clutch elements and its encircling outer clutch element and expandable to effect a driving relation between the same.

WALTER P. SCHMITTER.